United States Patent
Slocum et al.

(10) Patent No.: US 8,965,549 B2
(45) Date of Patent: Feb. 24, 2015

(54) CONTINUOUS PRODUCTION PLANNING USING A TRANSITION MATRIX

(71) Applicant: JDA Software Group, Inc., Scottsdale, AZ (US)

(72) Inventors: Gregory H. Slocum, Dallas, TX (US); Anand Iyer, Flower Mound, TX (US); John D. Brigham, Allston, MA (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

(21) Appl. No.: 14/053,480

(22) Filed: Oct. 14, 2013

(65) Prior Publication Data

US 2014/0046467 A1    Feb. 13, 2014

Related U.S. Application Data

(63) Continuation of application No. 10/175,488, filed on Jun. 19, 2002, now Pat. No. 8,560,363.

(51) Int. Cl.
| | |
|---|---|
| *G06F 19/00* | (2011.01) |
| *G05B 15/02* | (2006.01) |
| *G06Q 10/06* | (2012.01) |
| *G06Q 10/00* | (2012.01) |

(52) U.S. Cl.
CPC .............. *G05B 15/02* (2013.01); *G06Q 10/06* (2013.01)
USPC ............ 700/100; 700/99; 700/103; 705/7.12; 705/7.13; 705/7.23

(58) Field of Classification Search
CPC ................ G06Q 10/06; G05B 15/02
USPC ......... 705/7.12–7.13, 7.23; 700/99–100, 103, 700/105
See application file for complete search history.

(56) References Cited

U.S. PATENT DOCUMENTS

| | | |
|---|---|---|
| 5,280,425 A | 1/1994 | Hogge |
| 5,946,212 A | 8/1999 | Bermon et al. |
| 6,272,389 B1 | 8/2001 | Dietrich |
| 6,591,153 B2 | 7/2003 | Crampton et al. |
| 7,117,164 B2 * | 10/2006 | Slocum ...................... 705/7.31 |

(Continued)

OTHER PUBLICATIONS

D'Souza et al., Toward a taxonomy of manufacturing flexibility dimensions, Journal of Operation Management, 18 (2000); p. 577-593.

(Continued)

*Primary Examiner* — Ramesh Patel
(74) *Attorney, Agent, or Firm* — Jackson White, PC; Steven J. Laureanti

(57) ABSTRACT

A method for continuous production planning includes identifying a forbidden transition associated with production of first and second end products. The forbidden transition indicates that a manufacturer should not produce the first and second end products consecutively. The method also includes identifying a bridge product associated with the forbidden transition. The bridge product represents a product that the manufacturer could produce between production of the first and second end products. The method further includes determining a quantity of the bridge product that could be produced by the manufacturer. In addition, the method includes scheduling production of the first and second end products and the bridge product. At least a portion of the quantity of the bridge product is scheduled for production between the production of the first and second end products.

20 Claims, 7 Drawing Sheets

(56) References Cited

U.S. PATENT DOCUMENTS

| | | | | |
|---|---|---|---|---|
| 7,640,180 | B1* | 12/2009 | Slocum et al. | 705/7.25 |
| 8,214,250 | B2* | 7/2012 | Notani et al. | 705/7.31 |
| 8,560,363 | B1* | 10/2013 | Slocum et al. | 705/7.12 |
| 2002/0103686 | A1* | 8/2002 | Slocum | 705/8 |
| 2003/0220828 | A1 | 11/2003 | Hwang et al. | |

OTHER PUBLICATIONS

Chokshi et al., Rationale for Holonic Manufacturing Systems in Chemical Process Industries, IEEE 2001; p. 616-620.

Christiansen, Reed, Establishing Independence of Continuous Process Product Samples, AIChE Journal, Jul. 2000; p. 1441-1448.

McAauley et al., Optimal Grade Transitions in a Gas Phase Polyethylene Reactor, AIChE Journal, Oct. 1992; p. 1564-1576.

Giannelos et al., Efficient scheduling of consumer goods manufacturing processes in the continuous time domain, Computers & Operation Research, available online May 14, 2002; p. 1367-1381.

Randhawa et al., A Scheduling Decision Aid in Glass Fiber Manufacturing, Computers ind. Engng vol. 29, 1995; p. 255-259.

Orcun et al., General continuous time models for production planning and scheduling of batch processing plants; mixed integer linear program formulations and computational issues, Computers and Chemical Engineering 25 (2001) p. 371-389.

Hillier, Frederick and Lieberman, Gerald. Introduction to Operations Research, Sixth Edition. 1995. McGraw-Hill, Inc. p. 359-361, 380-381 and 391-392.

* cited by examiner

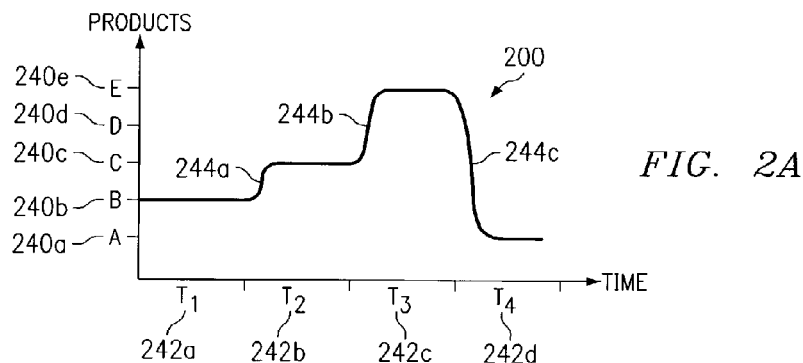
FIG. 2A
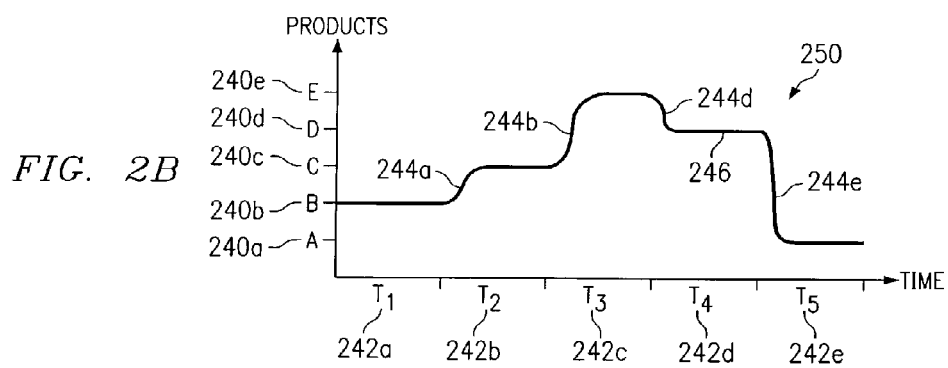
FIG. 2B
FIG. 3A

FIG. 3B

| 328 | | TO | | | | |
|---|---|---|---|---|---|---|
| | | 340a<br>A | 340b<br>B | 340c<br>C | 340d<br>D | 340e<br>E |
| FROM | 340a — A | — | 1 | 0 | 1 | 1 |
| | 340b — B | 1 | — | 0 | 0 | 0 |
| | 340c — C | 0 | 0 | — | 1 | 1 |
| | 340d — D | 1 | 0 | 1 | — | 0 |
| | 340e — E | 1 | 0 | 1 | 0 | |
| | | 6 | 5 | 8 | 8 | 4 |

FIG. 3C

| 328 | | TO | | | | |
|---|---|---|---|---|---|---|
| | | 340a<br>A | 340b<br>B | 340c<br>C | 340d<br>D | 340e<br>E |
| FROM | 340a — A | — | 2h | f | 1h | 2h |
| | 340b — B | 3h | — | f | f | f |
| | 340c — C | f | f | — | 3h | 2h |
| | 340d — D | 1h | f | 3h | — | f |
| | 340e — E | 1h | f | 1h | f | |
| | | 6 | 5 | 8 | 8 | 4 |

CONTINUOUS PRODUCTION PLANNING USING A TRANSITION MATRIX

CROSS-REFERENCE TO RELATED APPLICATIONS

This application is a continuation of U.S. patent application Ser. No. 10/175,488, filed on Jun. 19, 2002, now U.S. Pat. No. 8,560,363 and entitled "Continuous Production Planning Using a Transition Matrix." U.S. Pat. No. 8,560,363 is assigned to the assignee of the present application. The subject matter disclosed in U.S. Pat. No. 8,560,363 is hereby incorporated by reference into the present disclosure as if fully set forth herein.

TECHNICAL FIELD

This invention relates generally to production planning, and more particularly to continuous production planning using a transition matrix.

BACKGROUND

In the manufacturing industry, the production of a finished end product typically involves the use of one or more raw materials. Manufacturers may use the same production equipment to produce different end products in a continuous operation. Raw materials may be provided to the production equipment in a continuous stream, and products may be produced by the production equipment in a continuous stream. For example, a manufacturer may continuously feed chemical raw materials into a piece of production equipment that mixes the raw materials. The manufacturer may initially feed a first set of raw materials into the production equipment, which produces a first end product. At a later time, the manufacturer may begin feeding different raw materials into the same piece of production equipment. The production equipment may then produce a second end product.

Typical production equipment may not be able to instantaneously stop producing the first end product and begin producing the second end product. Instead, after the production equipment begins receiving the different raw materials, the production equipment may produce a transition product before producing the second product. The transition product represents a product that differs in at least one way from the first and second end products. A transition product may differ from one or both of the end products in a small way, in which case the transition product may be blended with one or both of the end products or sold as an "off-spec" product. A transition product could also differ from the end products to a larger extent, in which case the transition product may be unusable and the manufacturer may need to dispose of the transition product.

SUMMARY

According to the present invention, problems and disadvantages associated with previous production planning techniques may be reduced or eliminated.

In one embodiment of the invention, a method for continuous production planning includes identifying a forbidden transition associated with production of first and second end products. The forbidden transition indicates that a manufacturer should not produce the first and second end products consecutively. The method also includes identifying a bridge product associated with the forbidden transition. The bridge product represents a product that the manufacturer could produce between production of the first and second end products. The method further includes determining a quantity of the bridge product that could be produced by the manufacturer. In addition, the method includes scheduling production of the first and second end products and the bridge product. At least a portion of the quantity of the bridge product is scheduled for production between the production of the first and second end products.

One or more technical advantages may be provided according to various embodiments of the present invention. Particular embodiments of the invention may exhibit none, some, or all of the following advantages. For example, in one embodiment, a system for production planning is provided. In a particular embodiment, the system may use a transition matrix, which identifies various products that could be produced by a manufacturer. The transition matrix also identifies allowable and forbidden transitions between the products. An allowable transition may indicate that the manufacturer could produce two products consecutively. A forbidden transition may indicate that the manufacturer should not produce two products consecutively, such as when it would cause the manufacturer to produce an unusable transition product. The system may also identify a bridge product that may be used to overcome a forbidden transition in the transition matrix. A bridge product may represent a product that the manufacturer could produce between production of two other products separated by a forbidden transition. As a particular example, a transition matrix may indicate that a manufacturer should not produce products A and C consecutively, and the system may determine that product B may act as a bridge product. In this example, a manufacturer could produce both products A and C, as long as the manufacturer produces product B between products A and C. This may allow, for example, the system to plan production of the products around the forbidden transitions. This may also help to increase the efficiency of the production planning process and to decrease production of unusable products.

Another advantage of certain embodiments of the invention is that the manufacturer may earn more money through the sale of the bridge products. For example, the manufacturer may need to produce certain quantities of various end products to meet the demands of its customers. The system may use the transition matrix and determine that production of the end products would require production of a quantity of a bridge product. The system could also determine that an additional quantity of the bridge product could be produced. Using one or both identified quantities, the manufacturer may then, for example, use its sales and marketing personnel to generate demand for an appropriate amount of the bridge product. This may allow the manufacturer to set more profitable prices or obtain other more favorable contract terms for the sale of the bridge product.

One or more other technical advantages may be readily apparent to one of skill in the art from the figures, description, and claims included herein.

BRIEF DESCRIPTION OF THE DRAWINGS

To provide a more complete understanding of the present invention and features and advantages thereof, reference is made to the following description in conjunction with the accompanying drawings, in which:

FIGS. 2A and 2B illustrate example production schedules of a manufacturer;

FIGS. 3A through 3F illustrate an example transition matrix used to perform production planning operations;

DETAILED DESCRIPTION

Figure 1:
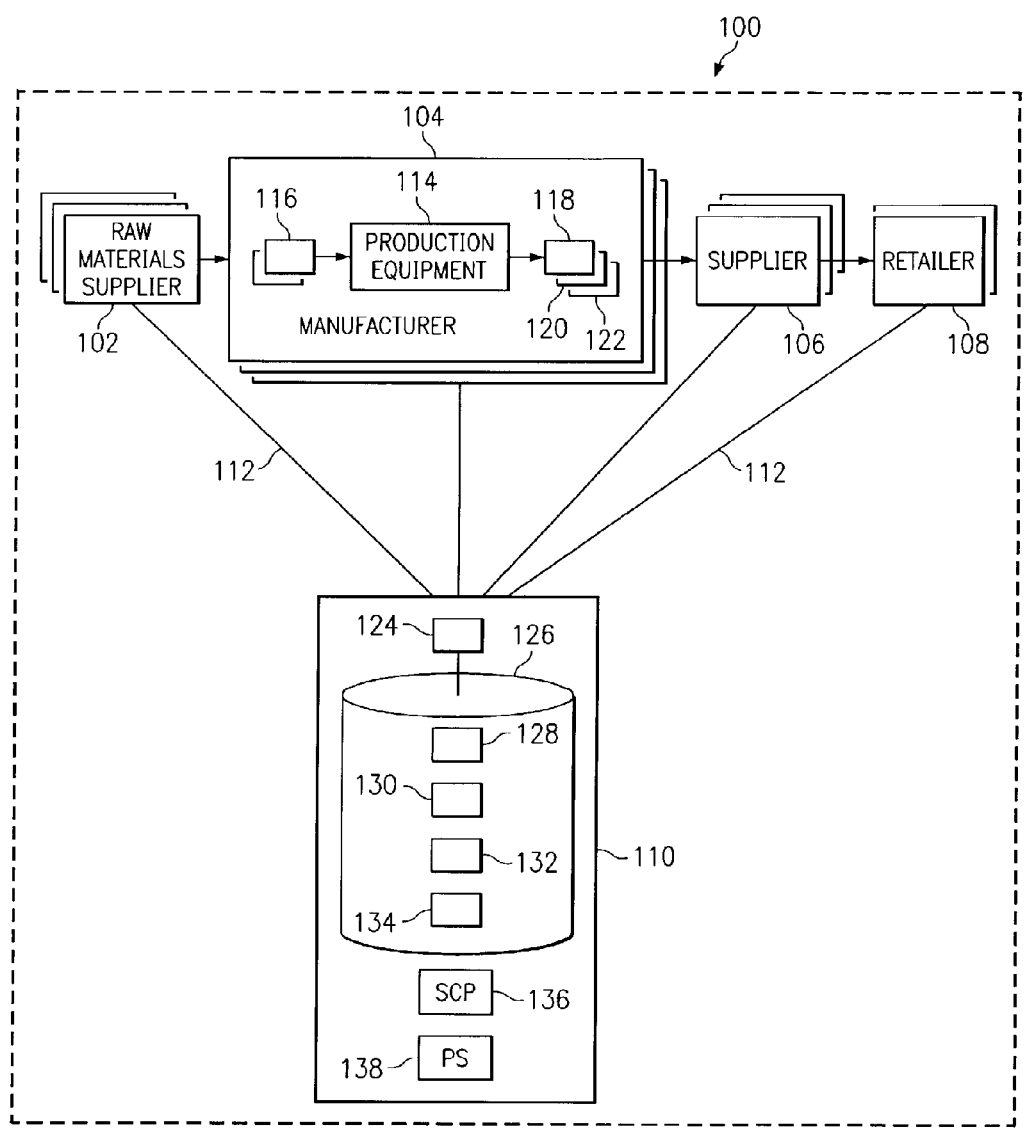
FIG. 1 illustrates an example system for production planning using a transition matrix.

FIG. 1 illustrates an example system 100 for production planning using a transition matrix 128. In the illustrated embodiment, system 100 includes one or more raw materials suppliers 102, one or more manufacturers 104, one or more suppliers 106, and one or more retailers 108. Other embodiments of system 100 may be used without departing from the scope of the present invention.

A raw materials supplier 102 may be any suitable entity that offers to sell or otherwise provides one or more raw materials to one or more manufacturers 104. A manufacturer 104 may be any suitable entity that manufactures at least one end product. Manufacturer 104 may use one or more raw materials during the manufacturing process to produce an end product. In this document, the phrase "end product" may refer to any manufactured, fabricated, assembled, or otherwise processed item. An end product may represent an item ready to be supplied to another entity in system 100 such as supplier 106, an item that needs further processing, or any other item. A manufacturer 104 may, for example, produce and sell an end product to a raw materials supplier 102, another manufacturer 104, a supplier 106, a retailer 108, or other suitable person or enterprise. A supplier 106 may be any suitable entity that offers to sell or otherwise distributes at least one end product to one or more retailers 108. A retailer 108 may be any suitable entity that obtains one or more end products to sell to its own customers. Although FIG. 1 illustrates raw materials suppliers 102, manufacturers 104, suppliers 106, and retailers 108 as separate and distinct entities, the same person or enterprise could simultaneously act as a raw materials supplier 102, a manufacturer 104, a supplier 106, and/or a retailer 108. For example, an enterprise acting as a manufacturer 104 could produce an end product, and the same enterprise could act as a raw materials supplier 102 to supply a raw material to another manufacturer 104. Also, FIG. 1 illustrates one example supply chain or operational environment of the invention. Other environments and/or supply chains may be used without departing from the scope of the present invention.

Raw materials suppliers 102, manufacturers 104, suppliers 106, and retailers 108 may be coupled to a production server 110 using links 112. Links 112 may each include one or more local area networks (LANs), metropolitan area networks (MANs), wide area networks (WANs), a portion of the global computer network known as the Internet, or any other appropriate wireline, wireless, or other links. In this document, the term "couple" refers to any direct or indirect communication between two or more elements, whether or not those elements are in physical contact with one another.

In one embodiment, a manufacturer 104 may include production equipment 114. Production equipment 114 may represent one or more structures or apparatuses operable to receive one or more raw materials 116 and perform at least one operation to transform the raw materials 116 into one or more end products 118. In a particular embodiment, manufacturer 104 may provide raw materials 116 to production equipment 114 in a continuous stream, and production equipment 114 may produce end products 118 in a continuous stream. For example, manufacturer 104 may feed one set of raw materials 116 to production equipment 114, and production equipment 114 may produce a first end product 118. Manufacturer 104 may, at a later time, begin feeding a different set of raw materials 116 to production equipment 114. Production equipment 114 may then produce a transition product 120 for a period of time, followed by production of a second end product 118. Production equipment 114 may produce the transition product 120 because production equipment 114 may be unable to instantaneously stop producing the first end product 118 and begin producing the second end product 118. In this document, the term "transition" may refer to production equipment 114 switching from production of one end product 118 to the production of another end product 118. The quantity of a transition product 120 produced and the length of time the transition product 120 is produced may depend on the production equipment 114, the raw materials 116, the end products 118, the transition product 120, and/or on any other suitable factors. Examples of the production schedules used by production equipment 114 are shown in FIGS. 2A and 2B, which are described below.

In the illustrated embodiment, a production server 110 may perform production scheduling operations in system 100. In general, production server 110 may receive and/or generate information identifying the end products 118 to be produced by manufacturer 104 and the quantities of the end products 118 to be produced. Production server 110 may also receive and/or generate information identifying which products, such as end products 118, can be produced consecutively by production equipment 114 and which products should not be produced consecutively. When two products should not be produced consecutively, production server 110 may further identify one or more bridge products 122. A bridge product 122 represents a product that could be produced between the production of two other products, where production equipment 114 could appropriately transition from one product to the bridge product 122 and from the bridge product 122 to the other product. A bridge product 122 could represent an end product 118 and/or any other suitable product that could be produced between two other products. In addition, production server 110 may schedule when the end products 118 and bridge products 122 are to be produced by production equipment 114.

In one embodiment, production server 110 may include one or more processors 124 and a memory 126. Memory 126 may comprise any of a variety of data structures, arrangements, and/or compilations operable to store and facilitate retrieval of information. Memory 126 may, for example, comprise one or more volatile or non-volatile memory devices. Although FIG. 1 illustrates memory 126 as residing within production server 110, memory 126 may reside in any location or locations that are accessible by processor 124. Memory 126 receives and stores information related to production planning operations. Processor 124 processes information stored in memory 126 and performs production planning operations for manufacturer 104.

Memory 126 may store and processor 124 may process any suitable information to perform production planning operations in system 100. The following examples are for illustration only. Any other suitable type of information may be used in system 100 without departing from the scope of the present invention. Also, although the following description describes production server 110 receiving information electronically from various sources, other collection methods may be used. For example, a user could enter the data manually into production server 110 using a workstation, personal computer, or any other suitable data entry device.

In one embodiment, memory 126 stores a transition matrix 128. Transition matrix 128 stores information identifying which products, such as end products 118, can be produced consecutively by production equipment 114 and which products should not be produced consecutively. In this document, the term "matrix" may refer to any compilation, data structure, and/or arrangement of information identifying whether products can or should be produced consecutively by production equipment 114. In one embodiment, transition matrix 128 includes a grid having rows and columns. Each one of the products that can be produced by production equipment 114 may be associated with one row and one column in transition matrix 128. In a particular embodiment, at the intersection of a row and a column, transition matrix 128 identifies whether production equipment 114 may transition from producing the product associated with the row to the product associated with the column. If allowed, transition matrix 128 may identify this as an allowable transition and give other appropriate information, such as the length of time that a transition product 120 may be produced during the allowable transition. Otherwise, transition matrix 128 may identify this as a forbidden transition. If production server 110 identifies a bridge product 122 that overcomes the forbidden transition, production server 110 may insert the identity of the bridge product 122 and the amount of time that the bridge product 122 should be produced into transition matrix 128. Transition matrix 128 may store any other and/or additional information without departing from the scope of the present invention. One example of a transition matrix is shown in FIGS. 3A through 3F, which are described below.

Memory 126 may also store production information 130. Production information 130 may include information that identifies various characteristics about the production of products 118-122. For example, production information 130 could identify the amount of time required for production equipment 114 to produce a specified quantity of an end product 118, such as the time required to produce one lot of an end product 118. Production information 130 could also identify the quantity of a transition product 120 that is produced between production of two end products 118, as well as the amount of time that the transition product 120 is produced. Production information 130 could further identify the raw materials 116 needed to produce each product 118-122, the quantities of the raw materials 116 needed to produce each product 118-122, the quantity of end product 118 forming a lot, and any other and/or additional information regarding the production of products 118-122.

Memory 126 may further store demand information 132. Demand information 132 may include information that can be used to predict the demand for one or more products 118-122. For example, demand information 126 could include historical, current, or projected orders from other manufacturers 104, suppliers 106, and retailers 108 for end products 118. The orders for the end products 118 may identify the end products 118 ordered, the quantity of end products 118 ordered, and when the end products 118 are to be delivered. Demand information 132 could also include sales information, such as information collected from one or more point of sale (POS) terminals associated with one or more retailers 108. Demand information 126 could further include sales predictions from other manufacturers 104, suppliers 106, and retailers 108. In addition, demand information 132 could include information about the availability of one or more raw materials 116 from raw materials suppliers 102, sales histories of the end product 118, price histories of the end product 118, information concerning related products, and/or any other suitable information that may be used to predict the demand for one or more end products 118, transition products 120, and/or bridge products 122.

In addition, memory 126 may store business rules 134. Business rules 134 may identify various user and/or other preferences that production server 110 may use when performing production planning operations. Business rules 134 may, for example, identify how production server 110 should identify bridge products 122 for forbidden transitions in transition matrix 128. As a particular example, two different bridge products 122 could be used to overcome a forbidden transition in transition matrix 128. One bridge product 122 could take longer to produce. Another bridge product 122 could represent an "off-spec" product, or a product that differs from the specified characteristics of an end product 118. A business rule 134 could identify whether a user prefers to minimize the time required to produce a bridge product 122 or to minimize the quantity of off-spec product produced. As another example, production server 110 may schedule production of the end products 118. A business rule 134 could indicate that the end products 118 for one supplier 106 could be delivered up to five days late, while another business rule 134 could indicate that the end products 118 for another supplier 106 should not be delivered late. Any other and/or additional business rules 134 may be used in system 100 without departing from the scope of the present invention.

In one embodiment, production server 110 could also include a supply chain planner (SCP) 136 and/or a production scheduler (PS) 138. Supply chain planner 136 may perform planning operations across a supply chain, such as a supply chain involving raw materials suppliers 102, manufacturers 104, suppliers 106, and retailers 108. For example, supply chain planner 136 may allow the entities in the supply chain to collaborate, monitor, and control various aspects of how end products 118 may be produced and distributed in the supply chain. As particular examples, supply chain planner 136 may perform various processes to identify demand for products 118-122, control the inventory of products 118-122, and plan the distribution and transportation of products 118-122. In addition, supply chain planner 136 may allow various entities in the supply chain to submit and accept orders, such as a manufacturer 104 accepting orders for end products 118 from suppliers 106. Supply chain planner 136 may include any hardware, software, firmware, or combination thereof operable to allow entities of a supply chain to collaborate and perform one or more planning operations. In one embodiment, supply chain planner 136 may include one or more software routines executed by processor 124.

Production scheduler 138 may perform one or more planning operations to schedule the production of end products 118, transition products 120, and/or bridge products 122. For example, in one embodiment, manufacturer 104 may produce end products 118, transition products 120, and/or bridge products 122 during a plurality of time windows in a planning horizon. In this embodiment, production scheduler 138 may determine which product should be produced during each of the time windows. In a particular embodiment, production scheduler 138 may take into account any business rules 134 specifying user preferences in generating the production schedule. Production scheduler 138 may include any hardware, software, firmware, or combination thereof operable to schedule production of one or more products. In one embodiment, production scheduler 138 may include one or more software routines executed by processor 124.

In one embodiment, production server 110 may use some or all of the information in memory 126 to identify one or more bridge products 122 used to overcome forbidden transitions in transition matrix 128. Production server 110 may also use at least some of the information in memory 126 to identify the quantity of the bridge products 122 that may be produced by manufacturer 104. For example, production server 110 could use supply chain planner 136 to identify any existing demand for a bridge product 122. Production server 110 could also identify an additional quantity of the bridge product 122 that could be produced by manufacturer 104. Production server 110 could make the identity of the bridge product 122, the quantity of the bridge product 122 needed to satisfy existing demand, and the additional quantity of the bridge product 122 that could be produced available to production scheduler 138. Production scheduler 138 could schedule production of the end products 118 and the bridge products 122. As a particular example, production scheduler 138 could schedule production of a quantity of bridge product 122 that satisfies all of the existing demand for bridge product 122. Production scheduler 138 could also schedule production of all, some, or none of the additional quantity of the bridge product 122. If at least some of the additional quantity of the bridge product 122 is scheduled for production, manufacturer 104 may take steps to generate demand for the additional quantity, such as by using its sales and marketing personnel to generate additional demand for the bridge product 122 and/or making the additional quantity available for sale in an electronic marketplace. This may allow system 100 to plan production of end products 118 around the forbidden transitions contained in transition matrix 128. This may also help to increase the efficiency of the production planning process and to decrease production of unusable products, such as unusable transition products 120. This may further allow manufacturer 104 to set more profitable prices or obtain other more favorable contract terms for the sale of bridge products 122.

Although FIG. 1 illustrates an example embodiment of system 100, various changes may be made to system 100 without departing from the scope of the present invention. For example, the components of production server 110 may operate on one or more computers at one or more locations. Although production server 110 is described primarily as being separate from the various entities in system 100, production server 110 may share one or more computer or other appropriate resources with one or more raw materials suppliers 102, manufacturers 104, suppliers 106, and/or retailers 108 according to particular needs. Also, information 128-134 may be provided to production server 110 electronically, by a user, or in any other suitable manner. Further, the functionality of production server 110 may be implemented on any computing device or devices, such as a desktop computer, a laptop computer, a server computer, or a personal digital assistant. In addition, the functional divisions of production server 110 are for illustration only. Various components may be added, combined, or removed according to particular needs. Other changes may be made to system 100 without departing from the scope of the present invention.

FIGS. 2A and 2B illustrate example production schedules of a manufacturer 104. In particular, FIG. 2A illustrates an example production schedule 200 without production of a bridge product, and FIG. 2B illustrates an example production schedule 250 that includes production of a bridge product. In the illustrated embodiment, schedules 200 and 250 illustrate the production of products 240 by manufacturer 104 during time windows 242 of a planning horizon. The information illustrated in FIGS. 2A and 2B is for illustration only. Other products 240 and/or times may be used by manufacturer 104 without departing from the scope of the present invention.

In FIG. 2A, manufacturer 104 produces product 240*b* during the first time window 242*a*. After that, manufacturer 104 transitions to producing product 240*c* during the second time window 242*b*. Because of the transition, manufacturer 104 produces a transition product 244*a* between the production of the products 240*b* and 240*c*. Similarly, after the second time window 242*b*, manufacturer 104 transitions to producing product 240*e* during the third time window 242*c*. Because of that transition, manufacturer 104 produces transition product 244*b*. Further, manufacturer 104 transitions to producing product 240*a* during the fourth time window 242*d*, leading to the production of transition product 244*c*.

In a particular embodiment, transition products 244*a* and 244*b* may be usable by manufacturer 104. For example, manufacturer 104 may be able to blend transition product 244*a* with product 240*b* and blend transition product 244*b* with product 240*e*. However, transition product 244*c* may represent an unusable product. For example, manufacturer 104 may be unable to blend transition product 244*c* with another product 240. As a result, manufacturer 104 may not want to allow production equipment 114 to transition from product 240*e* to product 240*a*, and this transition may be labeled as a forbidden transition in transition matrix 128.

In FIG. 2B, manufacturer 104 inserts production of a bridge product 246 between production of product 240*e* and product 240*a*. In the illustrated example, bridge product 246 represents product 240*d*. By inserting production of a bridge product 246 between production of products 240*e* and 240*a*, manufacturer 104 may produce transition products 244*d* and 244*e*, rather than transition product 244*c*. Manufacturer 104 may be able to dispose of transition products 244*d* and 244*e*, such as through blending transition products 244*d* and 244*e* with one or more products 240. As a result, production server 110 may identify bridge product 246 in transition matrix 128 as bridging the forbidden transition between products 240*e* and 240*a*. If manufacturer 104 wants to produce products 240*e* and 240*a* in a planning horizon, production server 110 may identify a quantity of bridge product 246 to be produced by manufacturer 104. If the quantity of the bridge product 246 to be produced exceeds existing demand for that bridge product 246, manufacturer 104 may then take any suitable action, such as using its sales and marketing personnel to generate demand for an appropriate amount of bridge product 246.

Although FIGS. 2A and 2B illustrate example production schedules 200 and 250, various changes may be made to schedules 200 and 250 without departing from the scope of the present invention. For example, a production schedule may involve any number of products 240 and/or time windows 242. Also, the illustrated production schedules 200 and 250 are examples only. Any other suitable schedules may be used without departing from the scope of the present invention.

FIGS. 3A through 3F illustrate an example transition matrix 328 used to perform production planning operations. In the illustrated embodiment, transition matrix 328 identifies allowable and forbidden transitions involving the production of five products 340*a*-340*e*. The information illustrated in FIGS. 3A through 3F is for illustration only. Other products 340 and/or transitions may be used by manufacturer 104 without departing from the scope of the present invention.

As illustrated in FIG. 3A, transition matrix 328 may include two axes 350*a* and 350*b*. Each axis 350 may identify the products 340 that may be produced by manufacturer 104. Products 340 could represent end products 118, transition products 120, bridge products 122, and/or any other suitable products. The axes 350 may define entries 352 in transition matrix 328. An entry 352 may be associated with one product 340 in the first axis 350a and one product 340 in the second axis 350b. In this embodiment, an entry 352 may contain a transition value identifying whether production equipment 114 should transition from producing the product 340 from axis 350a to producing the product 340 from axis 350b. For example, entry 352a has a transition value of one, indicating that production equipment 114 could transition from producing product 340a to producing product 340e. This may occur, for example, when transitioning from producing product 340a to producing product 340e would result in the production of a usable transition product 120. Similarly, entry 352b has a transition value of zero, indicating that production equipment 114 should not transition from producing product 340b to producing product 340e. This may occur, for example, when transitioning from producing product 340b to producing product 340e would result in the production of an unusable transition product 120. Some entries 352, such as entry 352c, need not identify any type of transition. This may occur, for example, when the entry 352 is associated with the same product 340 along both axes 350.

Transition matrix 328 could also include additional information. For example, in the illustrated embodiment, transition matrix 328 includes production times 354a-354e for products 340. In one embodiment, manufacturer 104 may produce products 340 in lots, and each production time 354 identifies the minimum size of each lot of a product 340 in production hours. For example, production time 354a indicates that production equipment 114 spends a minimum of six hours producing one or more lots of product 340a. Other and/or additional information may be stored in transition matrix 328 without departing from the scope of the present invention.

Figure 3D:
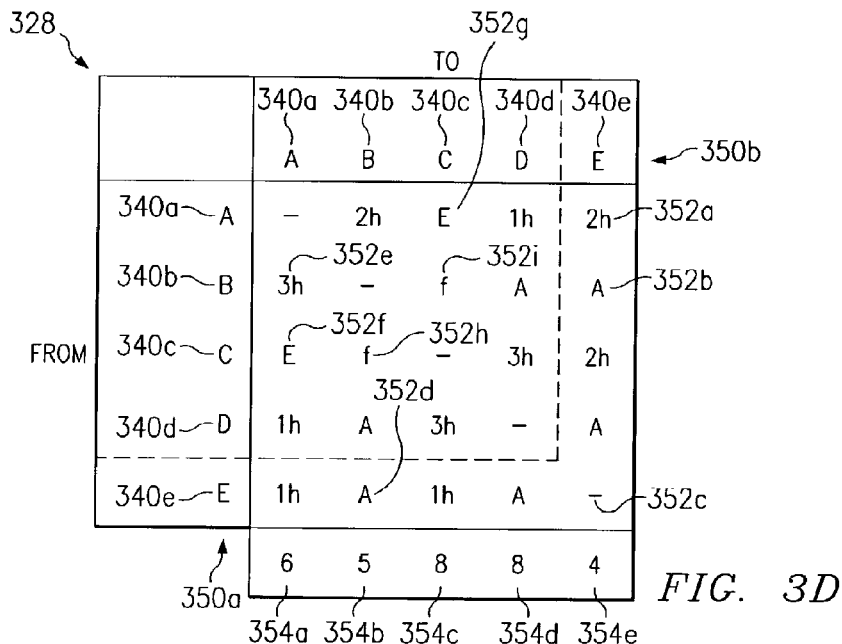

Production server 110 may process the information contained in transition matrix 328 and identify one or more bridge products 122 for each forbidden transition. As shown in FIG. 3B, in one embodiment, production server 110 may first reduce the size of transition matrix 328. For example, production server 110 may determine that no demand exists for product 340e. This may occur when no other entities in the supply chain wish to obtain product 340e from manufacturer 104. Because no demand exists for this product 340e, production server 110 need not process entries 352 involving that product 340e. This is illustrated in FIG. 3B by the shading of entries 352 associated with product 340e. However, to help explain the operation of production server 110, FIGS. 3C through 3F may show how production server 110 processes entries 352 associated with product 340e. Also, in another embodiment, production server 110 may process entries 352 without reference to whether demand exists for a product 340.

As shown in FIG. 3C, production server 110 may replace the transition values contained in entries 352 with transition time values. For example, an entry 352 associated with an allowable transition may initially have a transition value of one. Production server 110 may replace the transition value in that entry 352 with a transition time value identifying how long it takes production server 110 to transition from producing one product 340 to a different product 340. As a particular example, entry 352a indicates that production equipment 114 may produce a transition product 120 for two hours when production equipment 114 switches from producing product 340a to producing product 340e. The two-hour period during which production equipment 114 is producing the transition product 120 may or may not occur as part of the production time 354e of product 340e. In this example, production equipment 114 would produce the transition product 120 for two hours. As another example, entry 352b includes a value of "f" indicating that the transition from product 340b to product 340e is a forbidden transition. Although production server 110 has been and may further be described as replacing or inserting values in transition matrix 328, other embodiments may be used without departing from the scope of the present invention. For example, production server 110 could generate and fill new data structures, rather than replacing values in an existing transition matrix 328.

Figure 4:
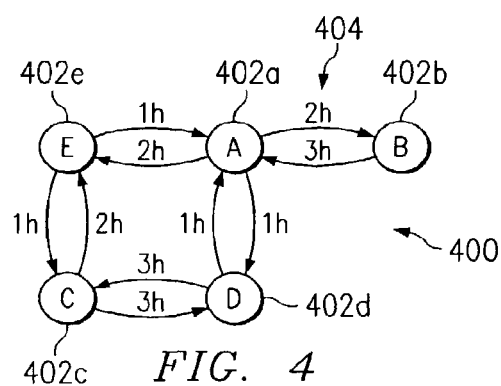
FIG. 4 illustrates an example graph identifying allowable transitions used to perform production planning operations.

Production server 110 may process transition matrix 328 and attempt to identify one or more bridge products 122 for each forbidden transition. In one embodiment, production server 110 identifies one or more bridge products 122 for a forbidden transition using a graph that identifies allowed transitions between products 340. One example of a graph illustrating allowed transitions is shown in FIG. 4, which is described below. In a particular embodiment, production server 110 may first attempt to bridge forbidden transitions in transition matrix 328 with one bridge product 122. If production server 110 is unable to bridge a forbidden transition with one bridge product 122, production server 110 may then attempt to bridge forbidden transitions in transition matrix 328 with multiple bridge products 122. Other methods of identifying one or more bridge products 122 for a forbidden transition may be used by production server 110 without departing from the scope of the present invention.

As shown in FIG. 3D, production server 110 may attempt to identify one bridge product 122 to bridge a forbidden transition. For example, entries 352b and 352d contain product values of "A," which indicate that product 340a may be used to bridge a transition between products 340b and 340e. This may be confirmed in FIG. 3D. Entry 352e shows that a transition is allowable between product 340b and 340a, and entry 352a shows that a transition is allowable between product 340a and 340e. As a result, product 340a may be used to bridge products 340b and 340e. Similarly, entries 352f and 352g contain product values of "E," indicating that product 340e may be used to bridge a transition between products 340a and 340c. However, entries 352h and 352i still contain a transition value of "f," indicating that the forbidden transition between products 340b and 340c cannot be bridged with one bridge product 122.

Figure 3E:
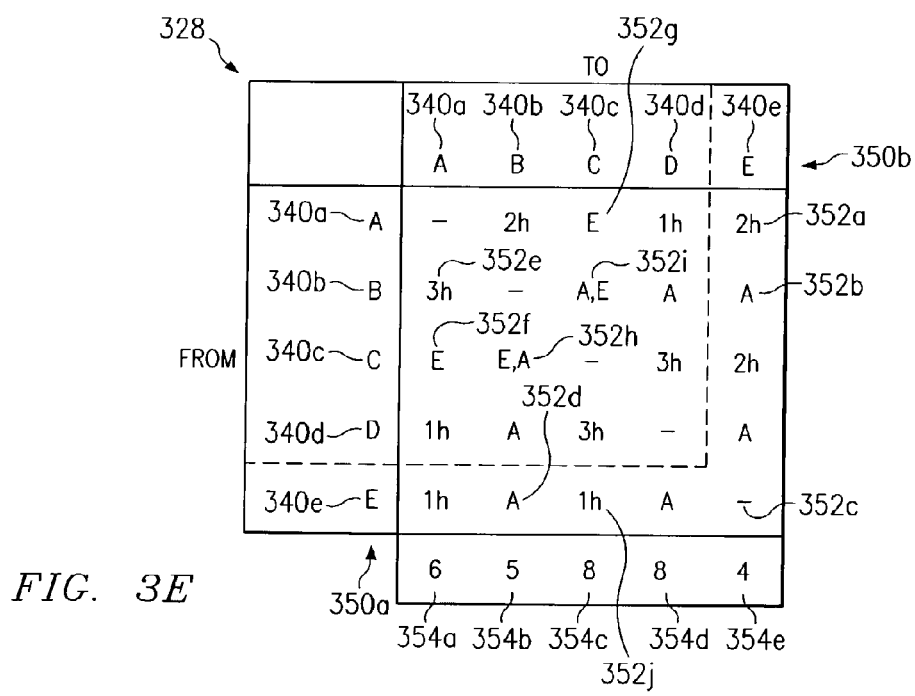

Because at least one forbidden transition cannot be bridged with one bridge product 122, production server 110 may attempt to identify multiple bridge products 122 to bridge the remaining forbidden transitions. As shown in FIG. 3E, entries 352f and 352g now contain product values of "A" and "E," indicating that products 340a and 340e may be used to bridge the forbidden transition between products 340b and 340c. This may also be confirmed in FIG. 3D. Entry 352e shows that a transition is allowable between product 340b and 340a, entry 352a shows that a transition is allowable between product 340a and 340e, and entry 352j shows that a transition is allowable between product 340e and 340c. As a result, products 340a and 340e may be used to bridge products 340b and 340c.

Figure 3F:
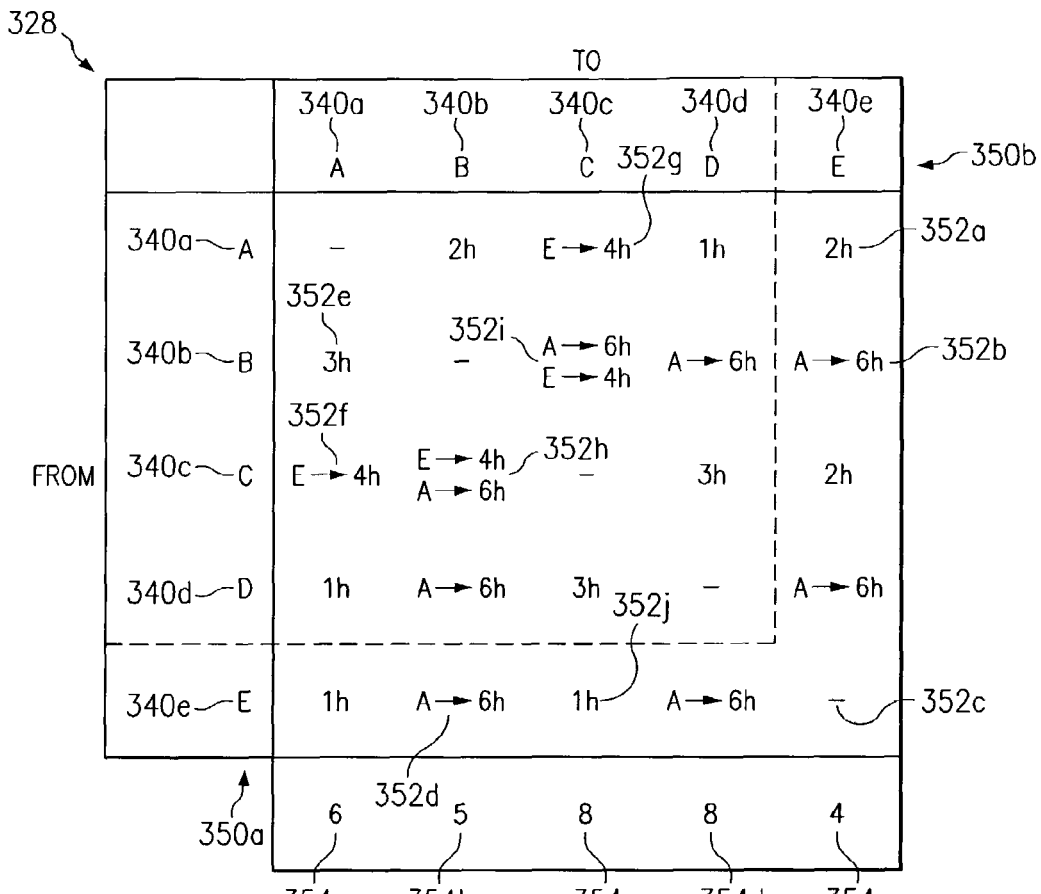

Finally, as shown in FIG. 3F, production server 110 may insert the production times 354 associated with the bridge products 122 into entries 352. For example, entry 352b contains both a product value identifying product 340a and a production time equal to the production time 354a of product 340a. This indicates that manufacturer 104 could bridge the transition between products 340b and 340e using product 340a, and product 340a would be produced for six hours between products 340b and 340e. Similarly, entry 352i contains product values of "A" and "E," plus production times of six hours and four hours, respectively. This indicates that manufacturer 104 could bridge the transition between products 340b and 340c using products 340a and 340e, and products 340a and 340e would be collectively produced for ten hours.

Although FIGS. 3A through 3F illustrate one example of a transition matrix 328 and how production server 110 may process and alter transition matrix 328, various changes may be made to transition matrix 328 and/or how production server 110 processes transition matrix 328 without departing from the scope of the present invention. For example, transition matrix 328 is illustrated as including production times 354. In another embodiment, production times 354 could be stored apart from transition matrix 328. Also, production server 110 is illustrated as replacing transition values in entries 352 with transition time values, product values, and/or production times. In another embodiment, production server 110 could generate one or more separate data structures to store transition time values, product values, and/or production times. Other changes may be made without departing from the scope of the present invention.

FIG. 4 illustrates an example graph 400 identifying allowable transitions used to perform production planning operations. In the illustrated embodiment, graph 400 includes nodes 402 and links 404. Other embodiments of graph 400 may be used without departing from the scope of the present invention. Also, the information contained in FIG. 4 is for illustration only. In particular, while graph 400 models the information contained in transition matrix 328 in FIGS. 3A through 3F, any other suitable information may be modeled by graph 400.

In one embodiment, graph 400 includes one node 402 for each product 340. If a direct transition is allowed between two products 340, a link 404 connects the two nodes 402 associated with those products 340. In the illustrated embodiment, each link 404 represents a directional connection between two nodes 402. As a result, nodes 402 and links 404 form a connected, directed graph 400.

In one embodiment, production server 110 may use graph 400 to identify one or more bridge products 122 that bridge a forbidden transition. For example, as shown in FIG. 4, no link 404 connects nodes 402b and 402c, so the transition between products 340b and 340c may initially appear as a forbidden transition in transition matrix 328. Production server 110 may identify one or more bridge products 122 to bridge the forbidden transition between products 340b and 340c.

Production server 110 may use any suitable method to identify one or more bridge products 122 to bridge a forbidden transition. In one embodiment, production server 110 may identify any articulation points in graph 400 between two nodes 402. An articulation point may represent a particular node 402 in graph 400 that is required to traverse graph 400 from a beginning or source node 402 to an end or destination node 402. In other words, if a particular node 402 was removed from graph 400 and no path would exist between the source node 402 and the destination node 402, the particular node 402 would represent an articulation point in graph 400. As an example, in FIG. 4, node 402a represents an articulation point between nodes 402b and 402c. If node 402a is removed from graph 400, no path would exist between nodes 402b and 402c. As a result, the product 340a associated with node 402a represents a bridge product 122 between products 340b and 340c associated with nodes 402b and 402c, respectively.

The identified articulation points may or may not completely bridge a forbidden transition. For example, as shown in FIG. 4, the use of product 340a as a bridge product 122 does not complete the path between nodes 402b and 402c. As a result, the forbidden transition between products 340b and 340c cannot be bridged with a single bridge product 122. In particular, if the articulation points identified by production server 110 do not completely bridge the path between nodes 402b and 402c, multiple paths may exist between those nodes. In the example above, while node 402a is an articulation point between nodes 402b and 402c, multiple paths exist in graph 400 because the path between nodes 402b and 402c may include either node 402d or node 402e. At this point, production server 110 may select one of the multiple paths between nodes 402b and 402c.

Production server 110 may use any suitable criteria to select one of the paths between nodes 402b and 402c. In one embodiment, production server 110 selects the shortest path between nodes 402b and 402c. The "shortest path" may represent a path involving the minimum amount of time needed to produce the products 340 along the path, a path involving the minimum number or quantity of off-spec products, and/or any other suitable path. In a particular embodiment, production server 110 may identify the shortest path between the source and destination nodes 402 using one or more business rules 134. As a particular example, a business rule 134 may indicate that a user wants production server 110 to minimize the time required to produce a bridge product 122. Using this business rule 134, production server 110 would compare the production time 354d needed to produce product 340d represented by node 402d to the production time 354e needed to produce product 340e represented by node 402e. As shown in the transition matrix 328 of FIGS. 3A through 3F, production time 354d for product 340d is eight hours, while production time 354e for product 340e is four hours. As a result, the shortest path travels through node 402e, and production server 110 would select product 340e represented by node 402e as the second bridge product 122 between nodes 402b and 402c. As another particular example, a business rule 134 may indicate that the user wants production server 110 to minimize the quantity of off-spec product produced. If node 402d represents an end product 118 produced by manufacturer 104 and node 402e represents an off-spec product, the shortest path travels through node 402d, and production server 110 would select product 340d represented by node 402d as the second bridge product 122 between nodes 402b and 402c.

While FIG. 4 illustrates an example of a graph 400 identifying allowable transitions in the production of products 340 by manufacturer 104, various changes may be made to graph 400 without departing from the scope of the present invention. For example, graph 400 could include any suitable number of nodes 402 and/or links 404. Also, each pair of connected nodes 402 in FIG. 4 is connected by two links 404. Two nodes 402 could be connected by a single link 404. In this case, manufacturer 104 could transition from a first node 402 to a second node 402, but manufacturer 104 would not be allowed to transition from the second node 402 to the first node 402.

Figure 5:
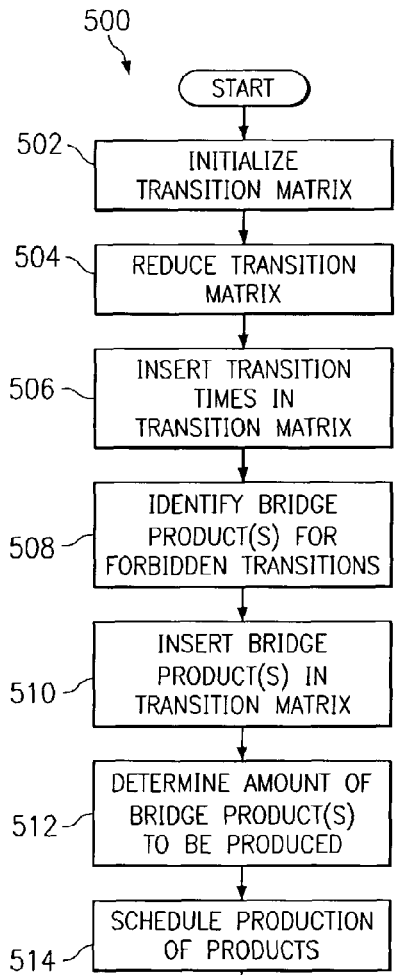
FIG. 5 illustrates an example method for continuous production planning using a transition matrix.

FIG. 5 illustrates an example method 500 for continuous production planning using a transition matrix. Although method 500 may be described with respect to system 100 of FIG. 1 processing the transition matrix 328 of FIGS. 3A through 3F, other systems and/or transition matrices may be used without departing from the scope of the present invention.

Production server 110 initializes the transition matrix 328 at step 502. This may include, for example, production server 110 generating transition matrix 328 by generating a grid having two axes 350, where each axis 350 lists the products 340 that may be produced by manufacturer 104. This may also include production server 110 storing values identifying allowable and forbidden transitions in one or more entries 352 in transition matrix 328. Production server 110 may store values in entries 352 using any suitable method. For example, production server 110 may use information stored in memory 126 to initialize the entries 352 in transition matrix 328. Production server 110 could also receive information from a user, such as a user associated with manufacturer 104, and use the information to initialize the entries 352 in transition matrix 328. In a particular embodiment, a value of zero in an entry 352 represents a forbidden transition, and a value of one represents an allowable transition.

Production server 110 attempts to reduce transition matrix 328 at step 504. This may include, for example, production server 110 determining whether any demand exists for the products 340 associated with transition matrix 328. If demand for a product 340 does not exist, production server 110 may remove the row and column associated with the product 340 from transition matrix 328. By reducing transition matrix 328, production server 110 may spend less time processing transition matrix 328 during later steps. In another embodiment, production server 110 need not reduce the size of transition matrix 328.

Production server 110 inserts the transition times in transition matrix 328 at step 506. This may include, for example, production server 110 locating each entry 352 that represents an allowable transition. This may also include production server 110 inserting a time value into each identified entry 352, where the time value identifies how long production equipment 114 produces a transition product 120 when transitioning between two products 340. This may further include production server 110 locating each entry 352 that represents a forbidden transition and inserting a flag, such as a value of "f," into those entries 352.

Figure 6:
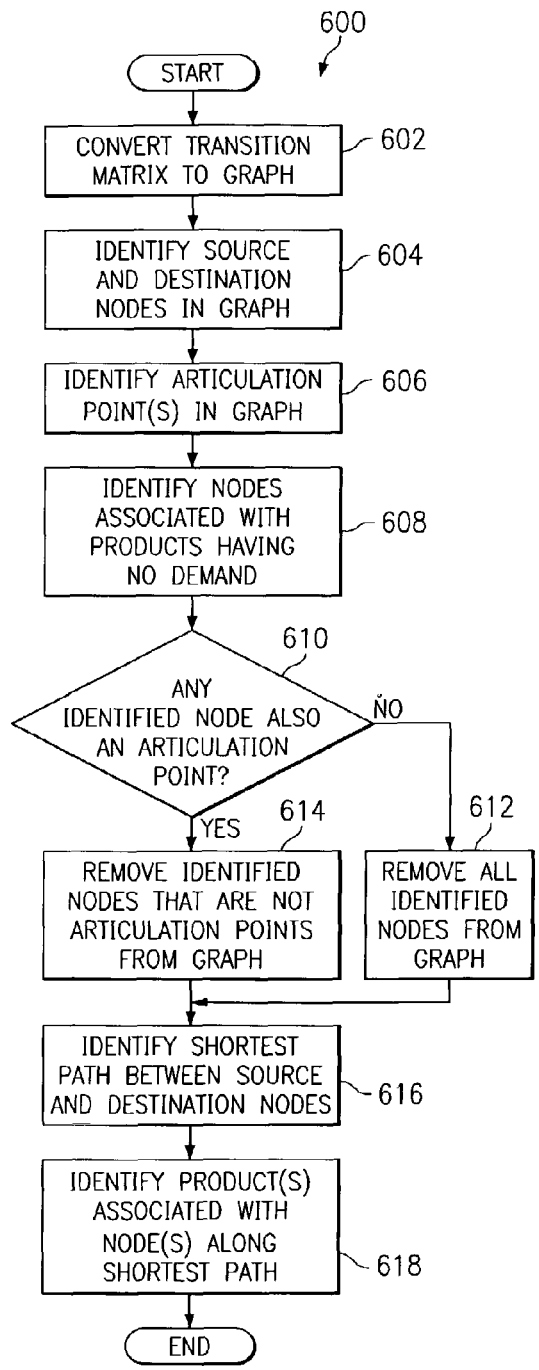
FIG. 6 illustrates an example method for identifying at least one bridge product that overcomes a forbidden transition in a transition matrix.

Production server 110 identifies one or more bridge products 122 used to bridge each forbidden transition at step 508. This may include, for example, production server 110 locating a forbidden transition in transition matrix 328. This may also include production server 110 using graph 400 to identify one or more bridge products 122 for that forbidden transition. One example of a method for identifying a bridge product 122 for a forbidden transition is shown in FIG. 6, which is described below. Production server 110 may then insert the identified bridge product or products 122 into the transition matrix 328 at step 510. This may include, for example, production server 110 storing information that identifies the one or more bridge products 122 in the appropriate entry 352 or entries 352.

Figure 7:
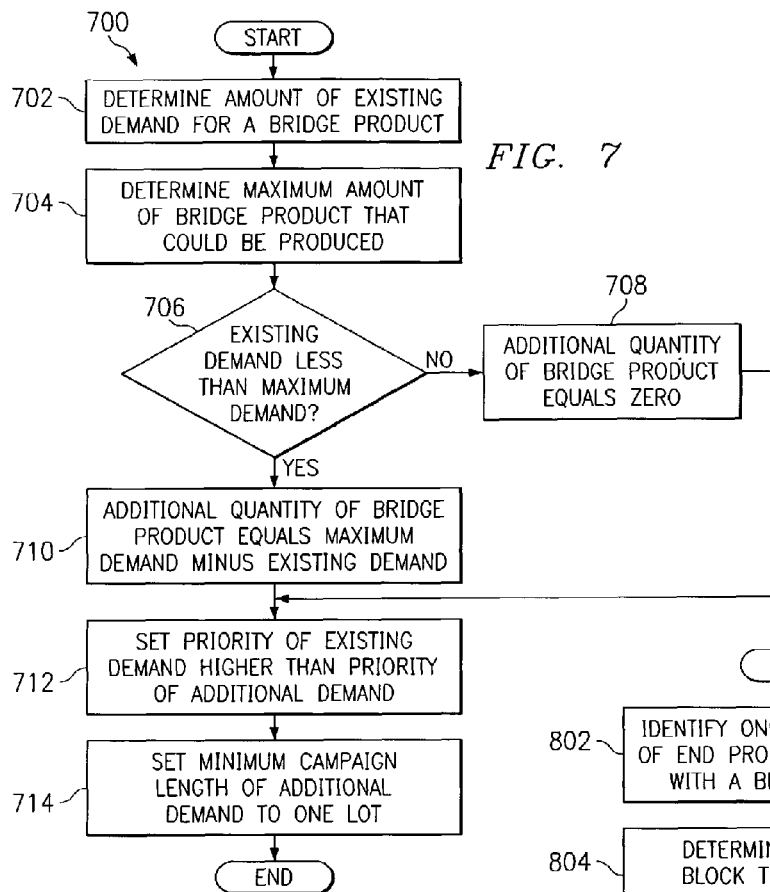
FIG. 7 illustrates an example method for determining an amount of at least one bridge product to be produced.

Production server 110 determines an amount of at least one bridge product 122 that could be produced at step 512. This may include, for example, production server 110 identifying the existing demand for the bridge product 122 by using supply chain planner 136 to analyze the demands of the various entities in the supply chain. This may also include production server 110 identifying the maximum amount of bridge product 122 that can be produced. This may further include production server 110 comparing the quantity of the existing demand with the maximum quantity and identifying any possible additional quantity that could be produced. One example of a method for determining an amount of at least one bridge product 122 to be produced is shown in FIG. 7, which is described below.

Production server 110 schedules production of products 340 and the bridge products 122 at step 514. This may include, for example, production server 110 using production scheduler 138 to schedule production of products 340 and the bridge products 122. Production scheduler 138 may schedule production of one or more of the quantities of the bridge product 122 identified at step 512, such as the quantity used to satisfy the existing demand and/or the additional quantity. This may further include production server 110 generating a production schedule identifying when each product is to be produced, the quantity of the products to be produced, and any other and/or additional information related to the production of products by manufacturer 104.

Although FIG. 5 illustrates one example of a method 500 for continuous production planning using a transition matrix, various changes may be made to method 500 without departing from the scope of the present invention. For example, production server 110 need not reduce transition matrix 328 at step 504 and/or replace the transition values in entries 352 with transition times at step 506.

FIG. 6 illustrates an example method 600 for identifying at least one bridge product 122 that overcomes a forbidden transition in a transition matrix 328. Although method 600 may be described with respect to system 100 of FIG. 1 processing the transition matrix 328 of FIGS. 3A through 3F, other systems and/or transition matrices may be used without departing from the scope of the present invention.

Production server 110 converts transition matrix 328 to a graph 400 at step 602. This may include, for example, production server 110 creating a node 402 for each product 340 listed in the axes 350 of transition matrix 328. This may also include production server 110 connecting nodes 402 using links 404, where each link 404 represents an allowable transition between two products 340. Production server 110 may, for example, generate graph 400 before reducing transition matrix 328 at step 504 of method 500 of FIG. 5.

Production server 110 identifies a source node 402 and a destination node 402 in graph 400 at step 604. This may include, for example, production server 110 identifying the products 340 separated by a forbidden transition. One product 340 may represent the product produced before the transition, and another product 340 may represent the product produced after the transition. Production server 110 may identify the source node 402 as the node 402 associated with the product 340 produced before the transition. Production server 110 may also identify the destination node 402 as the node 402 associated with the product 340 produced after the transition.

Production server 110 identifies any articulation points between the source and destination nodes 402 at step 606. This may include, for example, production server 110 identifying any nodes 402 in graph 400 that are required to traverse graph 400 from the source node 402 to the destination node 402. Production server 110 also identifies any nodes 402 in graph 400 that are associated with products 340 having no demand at step 608. This may include, for example, production server 110 identifying the demand for products 340, determining if any products 340 lack demand, and identifying any nodes 402 associated with products 340 that lack demand.

Production server 110 determines whether any of the identified nodes 402 associated with products 340 lacking demand are also articulation points at step 610. If none of the identified nodes 402 are articulation points, production server 110 removes the identified nodes 402 at step 612. This may include, for example, production server 110 removing the identified nodes 402 from graph 400. This may also include production server 110 removing any links 404 connected to the identified nodes 402. Otherwise, if at least one identified node 402 is also an articulation point, production server 110 removes the identified nodes 402 that are not articulation points at step 614.

Production server 110 identifies the shortest path between the source and destination nodes 402 at step 616. This may include, for example, production server 110 using one or more business rules 134 to identify the shortest path. As a particular example, a business rule 134 could identify whether a user prefers to minimize the time required to produce a bridge product 122 or to minimize the quantity of off-spec product produced. Using business rules 134, production server 110 may select a path through graph 400 between the source and destination nodes 402.

Production server 110 may identify one or more products 340 associated with the nodes 402 along the shortest path at step 618. These one or more products 340 represent the bridge between the source and destination nodes 402. As a result, these products 340 act as bridge products 122 that may be used to overcome a forbidden transition between the products 340 represented by the source and destination nodes 402.

Although FIG. 6 illustrates one example of a method 600 for identifying at least one bridge product 122 that overcomes a forbidden transition in a transition matrix 328, various changes may be made to method 600 without departing from the scope of the present invention. For example, production server 110 could identify nodes 402 associated with products 340 that lack demand before identifying any articulation points.

FIG. 7 illustrates an example method 700 for determining an amount of at least one bridge product 122 to be produced. Although method 700 may be described with respect to system 100 of FIG. 1, other systems may use method 700 without departing from the scope of the present invention.

Figure 8:
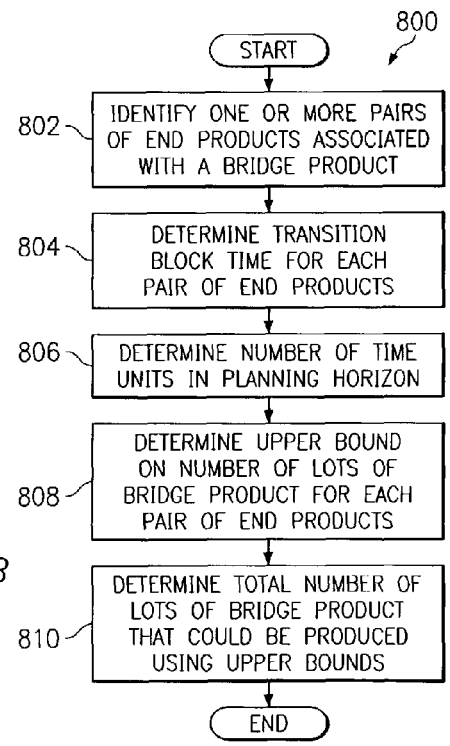
FIG. 8 illustrates an example method for determining a maximum amount of at least one bridge product to be produced.

Production server 110 determines an amount of existing demand for a bridge product 122 at step 702. This may include, for example, supply chain planner 136 analyzing the demands of the various entities in the supply chain and determining a total existing demand for the bridge product 122. Production server 110 determines a maximum amount of the bridge product 122 that could be produced by manufacturer 104 at step 704. Various methods may be used to determine the maximum amount of the bridge product 122 that could be produced by manufacturer 104. One example is shown in FIG. 8, which is described below.

Production server 110 determines whether the existing demand for the bridge product 122 is less than the maximum quantity of the bridge product 122 at step 706. This may include, for example, production server 110 comparing the maximum value determines at step 704 with the value identified at step 702. If the existing demand equals or is greater than the maximum value, production server 110 determines that manufacturer 104 cannot produce an additional quantity of the bridge product 122 at step 708. Otherwise, the existing demand is less than the maximum value, and production server 110 determines that manufacturer 104 can produce an additional quantity of the bridge product 122 at step 710. In one embodiment, the additional quantity of bridge product 122 that could be produced equals the difference between the maximum quantity and the existing demand.

Production server 110 sets a priority of the existing demand of bridge product 122 to a higher level than a priority of the additional quantity at step 712. The differing priority levels inform production scheduler 138 that the existing demand has a higher importance than the additional quantity of bridge product 122. Any suitable priority values could be used.

Production server 110 also sets the minimum production length associated with the additional quantity of bridge product 122 to one lot at step 714. The priority levels and production lengths may be used by production scheduler 138 to schedule production of the bridge product 122. For example, production scheduler 138 could use the minimum production length and determine that manufacturer 104 cannot produce both a quantity of bridge product 122 used to satisfy the existing demand and the additional quantity of bridge product 122. In this example, production scheduler 138 could examine the differing priorities and schedule production of the quantity used to satisfy the existing demand while ignoring the additional quantity.

Although FIG. 7 illustrates one example of a method 700 for determining an amount of at least one bridge product 122 to be produced, various changes may be made to method 700 without departing from the scope of the present invention. For example, production server 110 could identify the maximum quantity of bridge product 122 before identifying the existing demand. Also, FIG. 7 illustrates production server 110 setting the priority level of the existing demand higher than the priority of the additional demand. In another embodiment, production server 110 could process lower priorities ahead of higher priorities, and production server 110 could set the priority level of the existing demand lower than the priority of the additional demand at step 712. In addition, production server 110 need not specify a minimum production length of the additional demand at step 714. In another embodiment, production server 110 could use the production time 354 associated with the bridge product 122 in the transition matrix.

FIG. 8 illustrates an example method 800 for determining a maximum amount of at least one bridge product 122 to be produced. Although method 800 may be described with respect to system 100 of FIG. 1, other systems may use method 800 without departing from the scope of the present invention.

Production server 110 identifies one or more pairs of end products 118 associated with a bridge product 122 at step 802. This may include, for example, production server 110 examining transition matrix 128 and determining whether a bridge product 122 acts as a bridge between one or more pairs of end products 128. As a particular example, as shown in FIG. 3D, product 340e bridges the transition between products 340a and 340c, so product 340e acts as a bridge product for one pair of end products 340a and 340c. Product 340a bridges the transition between two pairs of products 340b, 340d and 340b, 340e.

Production server 110 determines a transition block time for each pair of end products 118 at step 804. In one embodiment, the transition block time for a bridge product 122 represents the smaller of either (1) the minimum production time 354 of the first end product 118 plus the run time of one lot of bridge product 122, and (2) the minimum production time 354 of the second end product 118 plus the run time of one lot of bridge product 122.

The production server 110 determines the number of time units that form a planning horizon at step 806. This may include, for example, production server 110 identifying the number of time windows 242 in the planning horizon. The time windows 242 could represent hours, days, weeks, or any other suitable time periods.

Production server 110 determines an upper bound on the number of lots of bridge product 122 that could be produced during the planning horizon for each pair of end products 118 at step 808. In one embodiment, the upper bound for one pair of end products 118 may be determined by dividing the number of time units in the planning horizon by the transition block time associated with the pair of end products 118. This value represents the maximum number of times that a transition between the pair of end products 118 could occur during the planning horizon. Assuming that one lot of the bridge product 122 would be produced during each transition, this value also represents the maximum number of lots of bridge product 122 that could be produced during the planning horizon for this pair of end products 118. In a particular embodiment, the upper bound associated with a pair of end products 118 could be set to zero if the existing demand for either end product 118 in the pair equals zero. The particular method used to identify the upper bound values could, for example, be specified by the user using one or more business rules 134.

In determining the upper bound for the bridge product 122, additional rules 134 and production policies could be taken into account. For example, a rule 134 could identify a minimum number of lot runs for a bridge product 122. As a particular example, rule 134 could state that manufacturer 104 should produce at least "n" lots of bridge product 122 after production of bridge product 122 begins. In this case, the rules 134 for determining the upper bound of bridge product 122 could take the minimum number of lot runs into account when determining the final upper bound.

Safety stock rules 134 could also be taken into account when determining the upper bound for the bridge product 122. For example, a rule 134 could specify that manufacturer 104 should keep "x" units of a product in stock to account for demand or supply variability. This rule 134 could apply to a particular product, a group of products, or all products produced by manufacturer 104. The final quantities determined for end products 118, as well as the computations for bridge products 122, may take this into account by considering additional requirements for any product as additional sources of demand. These sources of demand could also be given a different priority. For example, demand for end products 118, estimated demand for bridge products 122 based on the upper bounds, and the safety stock demand could have different priorities.

Production server 110 determines the total number of lots of bridge product 122 that could be produced during the planning horizon at step 810. This may include, for example, production server 110 using the upper bounds associated with pairs of end products 118 determined at step 808. In one embodiment, production server 110 may sum the upper bounds over all pairs of end products 118 to determine the total number of lots of bridge product 122. In another embodiment, production server 110 could identify the maximum upper bound and use the maximum upper bound as the total number of lots of bridge product 122. Other methods of determining the total number of lots of bridge product 122 to be produced may be used by production server 110 without departing from the scope of the present invention.

Although FIG. 8 illustrates one example of a method 800 for determining a maximum amount of at least one bridge product 122 to be produced, various changes may be made to method 800 without departing from the scope of the present invention. For example, production server 110 could determine the number of time units in a planning horizon before identifying pairs of end products 118. Also, other methods may be used to determine a maximum amount of at least one bridge product 122 to be produced without departing from the scope of this disclosure. In another embodiment, production server 110 could construct a sample production schedule and use the production schedule to identify the maximum amount of a bridge product 122 to be produced. In a particular embodiment, production server 110 could construct a production schedule that represents the "worst" schedule, or a schedule constructed using the longest transition times between products in the schedule. In addition, the logic illustrated in FIG. 8 could be executed in multiple steps. For example, in each step, production server 110 could process a subset of products 118 (and their associated bridge products 122) and schedule production of this first subset. Production server 110 could then re-execute the logic for a second subset of products 118 (and their associated bridge products 122). This may allow, for example, manufacturer 104 to consider different business rules 134 for each subset of products 118.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A system, comprising:
production equipment that produces a first end product, a second end product, and a transition product during transition from producing the first end product and the second end product;
a production server comprising a processor and memory, wherein the production server identifies the transition product, stores one or more rules in memory; and
when the transition product produced by the production equipment satisfies the one or more rules, the production equipment produces the transition product; and
when the transition product produced by the production equipment does not satisfy the one or more rules, the production server identifies at least one bridge product and the production equipment produces the bridge product.

2. The production system of claim 1, wherein the production server identifies at least one bridge product by:
generating a transition matrix comprising a source node associated with the first end product and a destination node associated with the second end product; and
identifying one or more articulation points between the source and destinations nodes, wherein each articulation point of the one or more articulation points identifies a bridge product.

3. The production system of claim 1, wherein the production server receives demand information from a supply chain entity, and the production server further identifies at least one bridge product by:
identifying each of the one or more articulation points associated with a bridge product having no demand; and
removing each of the one or more articulations points associated with a bridge product having no demand.

4. The production system of claim 3, the demand information comprising existing supply chain demand for a bridge product, and the one or more rules comprises:
determining a maximum amount of the bridge product that the production equipment can produce;
when the existing supply chain demand is less than the maximum amount of the bridge product, the production equipment produces an additional quantity of bridge product equal to the maximum amount of the bridge product minus the total existing supply chain demand; and
when the total existing supply chain demand is greater than the maximum amount of the bridge product, the additional quantity of the bridge product equals zero.

5. The production system of claim 4, wherein the one or more rules further comprises:
    set priority of exiting demand higher than priority of additional demand
    set minimum campaign length of additional demand to one lot.

6. The production system of claim 4, wherein determining a maximum amount of the bridge product that the production equipment can produce comprises:
    identify one or more pairs of end products associated with the bridge product;
    determine a transition block time for each pair of end products;
    determine a number of time units in a planning horizon;
    determine an upper bound of a number of lots of the bridge product for each pair of end products; and
    determine a total number of lots of the bridge product that the production equipment can produce using the upper bound of the number of lots of the bridge product.

7. The production system of claim 4, wherein the production server receives demand information by one or more of:
    receiving sales information from a point of sales terminal;
    receiving sales predictions from one or more of a manufacturer, supplier, and retailer;
    receiving availability information of one or more raw materials from a raw material supplier;
    receiving sales histories of end products;
    receiving price histories of end products; and
    receiving demand prediction information for one or more of the first and second end products, the transition product, or the bridge product.

8. A non-transitory computer-readable medium embodied with production software, the software when executed using one or more computers is configured to:
    identify a transition product, wherein the transition product is produced by production equipment that produces a first end product, a second end product, and the transition product during transition from producing the first end product and the second end product;
    store one or more rules;
    direct the production equipment to produce the transition product when the transition product produced by the production equipment satisfies the one or more rules; and
    identify at least one bridge product and direct the production equipment to produce the bridge product when the transition product produced by the production equipment does not satisfy the one or more rules.

9. The non-transitory computer-readable medium embodied with production software of claim 8, wherein the software identifies at least one bridge product by:
    generating a transition matrix comprising a source node associated with the first end product and a destination node associated with the second end product; and
    identifying one or more articulation points between the source and destinations nodes, wherein each articulation point of the one or more articulation points identifies a bridge product.

10. The non-transitory computer-readable medium embodied with production software of claim 8, wherein the software receives demand information from a supply chain entity, and the software further identifies at least one bridge product by:
    identifying each of the one or more articulation points associated with a bridge product having no demand; and
    removing each of the one or more articulations points associated with a bridge product having no demand.

11. The non-transitory computer-readable medium embodied with production software of claim 10, the demand information comprising existing supply chain demand for a bridge product, and the one or more rules comprises:
    determining a maximum amount of the bridge product that the production equipment can produce;
    when the existing supply chain demand is less than the maximum amount of the bridge product, the production equipment produces an additional quantity of bridge product equal to the maximum amount of the bridge product minus the total existing supply chain demand; and
    when the total existing supply chain demand is greater than the maximum amount of the bridge product, the additional quantity of the bridge product equals zero.

12. The non-transitory computer-readable medium embodied with production software of claim 11, wherein the one or more rules further comprises:
    set priority of exiting demand higher than priority of additional demand
    set minimum campaign length of additional demand to one lot.

13. The non-transitory computer-readable medium embodied with production software of claim 11, wherein determining a maximum amount of the bridge product that the production equipment can produce comprises:
    identify one or more pairs of end products associated with the bridge product;
    determine a transition block time for each pair of end products;
    determine a number of time units in a planning horizon;
    determine an upper bound of a number of lots of the bridge product for each pair of end products; and
    determine a total number of lots of the bridge product that the production equipment can produce using the upper bound of the number of lots of the bridge product.

14. The non-transitory computer-readable medium embodied with production software of claim 10, wherein the software receives demand information by one or more of:
    receiving sales information from a point of sales terminal;
    receiving sales predictions from one or more of a manufacturer, supplier, and retailer;
    receiving availability information of one or more raw materials from a raw material supplier;
    receiving sales histories of end products;
    receiving price histories of end products; and
    receiving demand prediction information for one or more of the first and second end products, the transition product, or the bridge product.

15. A method of production comprising:
    identifying, by a computer, a transition product, wherein the transition product is produced by production equipment that produces a first end product, a second end product, and the transition product during transition from producing the first end product and the second end product;
    storing, by the computer, one or more rules;
    directing, by the computer, the production equipment to produce the transition product when the transition product produced by the production equipment satisfies the one or more rules; and
    identifying, by the computer, at least one bridge product and direct the production equipment to produce the bridge product when the transition product produced by the production equipment does not satisfy the one or more rules.

16. The method of claim 15, wherein identifying at least one bridge comprises:
- generating, by the computer, a transition matrix comprising a source node associated with the first end product and a destination node associated with the second end product; and
- identifying, by the computer, one or more articulation points between the source and destinations nodes, wherein each articulation point of the one or more articulation points identifies a bridge product.

17. The method of claim 15, wherein identifying at least one bridge product further comprises:
- receiving, by the computer, demand information from a supply chain entity;
- identifying, by the computer, each of the one or more articulation points associated with a bridge product having no demand; and
- removing, by the computer, each of the one or more articulations points associated with a bridge product having no demand.

18. The method of claim 17, the one or more rules comprises:
- determining, by the computer, a maximum amount of the bridge product that the production equipment can produce;
- directing, by the computer, the production equipment to produce an additional quantity of bridge product equal to the maximum amount of the bridge product minus the total existing supply chain demand when the existing supply chain demand is less than the maximum amount of the bridge product; and
- directing, by the computer, the production equipment to produce no additional quantity of bridge product, when the total existing supply chain demand is greater than the maximum amount of the bridge product.

19. The method of claim 18, wherein the one or more rules further comprises:
- set priority of exiting demand higher than priority of additional demand
- set minimum campaign length of additional demand to one lot.

20. The method of claim 18, wherein determining a maximum amount of the bridge product that the production equipment can produce comprises:
- identify one or more pairs of end products associated with the bridge product;
- determine a transition block time for each pair of end products;
- determine a number of time units in a planning horizon;
- determine an upper bound of a number of lots of the bridge product for each pair of end products; and
- determine a total number of lots of the bridge product that the production equipment can produce using the upper bound of the number of lots of the bridge product.

* * * * *